US009282265B2

(12) United States Patent
Leung et al.

(10) Patent No.: US 9,282,265 B2
(45) Date of Patent: Mar. 8, 2016

(54) CAMERA DEVICES AND SYSTEMS BASED ON A SINGLE IMAGE SENSOR AND METHODS FOR MANUFACTURING THE SAME

(71) Applicant: OmniVision Technologies, Inc., Santa Clara, CA (US)

(72) Inventors: Kevin Ka Kei Leung, San Jose, CA (US); Wen Hua Lin, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 268 days.

(21) Appl. No.: 14/022,028

(22) Filed: Sep. 9, 2013

(65) Prior Publication Data

US 2015/0070466 A1    Mar. 12, 2015

(51) Int. Cl.
*H04N 13/00*    (2006.01)
*H04N 9/04*    (2006.01)
*G02B 27/22*    (2006.01)
*H04N 5/369*    (2011.01)
*H04N 13/02*    (2006.01)

(52) U.S. Cl.
CPC ............... *H04N 5/369* (2013.01); *H04N 9/045* (2013.01); *H04N 13/0217* (2013.01); *H04N 13/0257* (2013.01); *H04N 2213/001* (2013.01)

(58) Field of Classification Search
CPC .......... H04N 13/0217; H04N 13/0257; H04N 2213/001; H04N 5/369; H04N 9/045
USPC .............. 348/42, 46, 272, 273, 373; 359/462, 359/463; 353/7
See application file for complete search history.

(56) References Cited

U.S. PATENT DOCUMENTS

| 7,317,494 B2 * | 1/2008 | Mashitani | .......... H04N 13/0409 348/54 |
| 2004/0212677 A1 * | 10/2004 | Uebbing | ................ H04N 7/181 348/155 |
| 2010/0328437 A1 | 12/2010 | Lee | |
| 2010/0328457 A1 | 12/2010 | Lee | |
| 2011/0019048 A1 | 1/2011 | Raynor et al. | |
| 2011/0122308 A1 | 5/2011 | Duparre | |
| 2013/0215238 A1 * | 8/2013 | Yamazaki | .......... H04N 13/0239 348/49 |

\* cited by examiner

*Primary Examiner* — Trung Diep
(74) *Attorney, Agent, or Firm* — Lathrop & Gage LLP

(57) ABSTRACT

A camera device includes a single imaging sensor, a plurality of imaging objectives associated with the single imaging sensor, and a plurality of dedicated image areas within the single imaging sensor, each of the plurality of dedicated image areas corresponding to a respective one of the plurality of imaging objectives, such that images formed by each of the plurality of imaging objectives may be recorded by the single imaging sensor.

23 Claims, 18 Drawing Sheets

CAMERA DEVICES AND SYSTEMS BASED ON A SINGLE IMAGE SENSOR AND METHODS FOR MANUFACTURING THE SAME

BACKGROUND

Stereo cameras consist of two or more camera systems spatially offset from each other. Each camera captures an image of the same scene and subsequent analysis of the recorded images provides distance information in addition to standard two-dimensional images. The configuration mimics that of a pair of eyes. Humans perceive distance by comparing visual information taken in through the eyes. The distance between the eyes results in slight differences in the images formed in the two eyes. The brain processes this disparity to determine the distance to various objects in the scene and provide depth perception. Similarly, two cameras placed next to each other and viewing the same scene will capture slightly different images due to the distance between the two cameras. Objects from the scene will appear in slightly different positions in the images. If the cameras are spaced apart from each other by a known distance, the three-dimensional location of objects in the scene relative to the stereo camera can be determined from the captured images by triangulation. The triangulation is based on knowledge of (a) the positioning of the two cameras relative to each other and (b) the imaged locations of objects in the scene.

Stereo cameras are being found in an increasing number of applications requiring image capture and distance information for objects in the scene. For example, stereo cameras are being implemented in cars to help prevent accidents by monitoring the surroundings and determining if the car is getting too close to other objects or people. In addition to location and distance information, stereo cameras can provide the actual size of objects by applying the determined distance between the object and the stereo camera to the size of the object, as measured in the image. This feature is useful in applications requiring object recognition, such as surveillance, machine vision, and robotic equipment.

Many stereo camera applications either require or can benefit from a miniaturized device, and optics manufacturing technologies capable of producing miniaturized devices, e.g., micro lenses, have been developed. Stereo cameras based on pairs of centimeter-sized camera systems produced using micro optics manufacturing methods are available. However, for a stereo camera, the miniaturization implies a small distance between the two cameras, which in turn places high demands on both the system tolerances and the quality of the recorded images. In order to perform accurate triangulation using two cameras placed very close to each other, the relative positioning of the two cameras and the imaged location of objects in the two captured images must be known or determined with high accuracy.

SUMMARY

In accord with the teachings herein, camera systems and devices with two or more imaging objectives are based on a single imaging imaging sensor. By using a single imaging sensor and precision manufacturing methods, such as wafer level manufacturing, these systems and devices provide accurate knowledge of the relative positioning of the individual imaging systems, in a compact package. These features are particularly advantageous for stereo camera systems and devices, where accurate determination of the three-dimensional location of an object is conditional upon accurate knowledge of the relative positioning of the individual imaging systems. In some embodiments, the camera systems and devices include a non-homogeneous coating on the imaging sensor to improve the image quality and/or sensor sensitivity.

In an embodiment, a camera device includes a single imaging sensor, a plurality of imaging objectives associated with the single imaging sensor, and a plurality of dedicated image areas within the single imaging sensor, each of the plurality of dedicated image areas corresponding to a respective one of the plurality of imaging objectives, such that images formed by each of the plurality of imaging objectives may be recorded by the single imaging sensor.

DETAILED DESCRIPTION OF THE EMBODIMENTS

The stereo camera systems, devices, and methods disclosed herein are based on a single imaging sensor. Two or more imaging objectives are placed on the same imaging sensor with a subsection of the imaging sensor dedicated to each objective. These systems, devices, and methods inherently provide accurate knowledge of the relative positioning of the individual camera systems, each including an imaging objective and a subsection of the imaging sensor. In some embodiments, the presently disclosed stereo camera systems and devices include a non-homogeneous coating on the imaging sensor to improve the image quality and/or sensor sensitivity.

The stereo camera devices disclosed herein may be produced using wafer-level manufacturing methods, possibly in combination with pick and place methods. In general, these methods enable volume production at low cost. Importantly, wafer level manufacturing methods simplify alignment and post-production calibration requirements as each individual item produced by wafer level assembly is associated with identical alignment properties. This is particularly advantageous for devices requiring accurate knowledge of alignment properties, such as the stereo camera devices presently disclosed.

Further advantages are achieved with the stereo camera devices in the present disclosure. Since each stereo camera device is based on a single imaging sensor, as opposed to multiple imaging sensors, these stereo camera devices can be made more compact while using imaging sensors with standard form factors and packaging. In comparison, stereo camera devices based on independent imaging sensors for each individual imaging system within the device are likely to require a greater distance between the associated lens systems due to packaging elements such as support pieces, substrates, and electronics. Stereo camera devices based on a single imaging sensor also provide for simple integration into a greater system. A single set of readout electronics and/or communication interface is sufficient, and all image information is available in a single readout.

Figure 1:
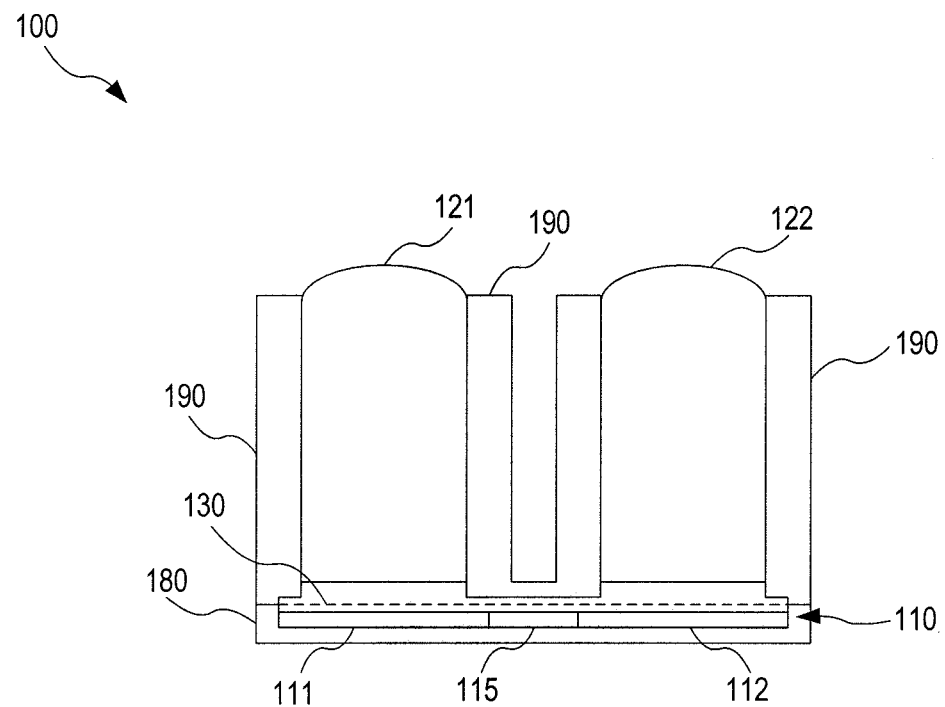
FIG. 1 illustrates one exemplary stereo camera device based on a two imaging systems sharing a single imaging sensor, in elevational view, according to an embodiment.
Figure 2:
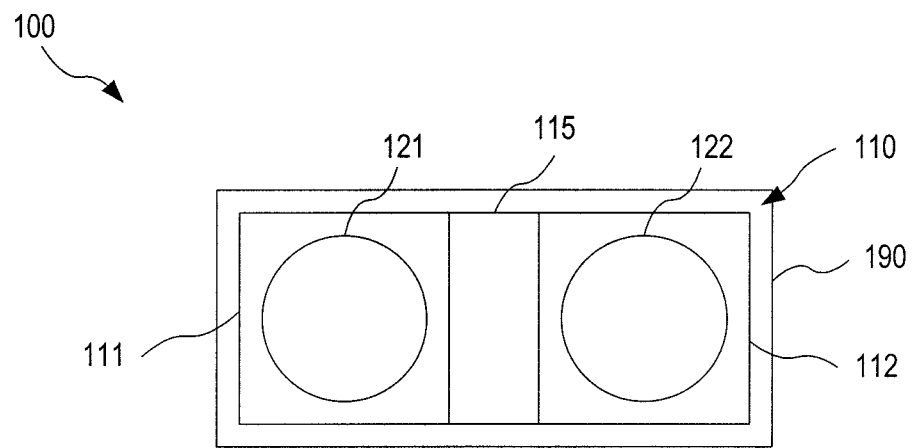
FIG. 2 illustrates the stereo camera device of FIG. 1 in top plan view.

FIGS. 1 and 2 are illustrations of a stereo camera device 100 shown in elevational view in FIG. 1 and top plan view in FIG. 2. Stereo camera device 100 is based on a single imaging sensor 110 and two imaging objectives 121 and 122. In certain embodiments, imaging sensor 110 is a digital imaging sensor and contains, for example, a CCD or CMOS array. Imaging sensor 110 includes a dedicated image area 111 for capture of the image formed by imaging objective 121 on imaging sensor 110. Likewise, imaging sensor 110 includes a dedicated image area 112 for capture of the image formed by imaging objective 122 on imaging sensor 110. Image area 111 together with imaging objective 121, and image area 112 together with imaging objective 122 each form an independent imaging system. Optionally, imaging objectives 121 and 122 contain multiple lenses and other optical elements such as apertures and filters. In an embodiment, imaging objectives 121 and 122 include wafer level lens stacks.

Imaging sensor 110 optionally includes a coating 130. In certain embodiments, coating 130 is a color filter, for instance a Bayer filter, enabling color image capture by imaging sensor 110. Image areas 111 and 112 are separated by a spacer portion 115 of imaging sensor 110. Spacer portion 115 may serve to provide additional distance between image areas 111 and 112 in order to reduce crosstalk between the imaging system composed by image area 111 together with imaging objective 121 and the imaging system composed by image area 112 together with imaging objective 122. Spacer portion 115 may also serve to space image areas 111 and 112 at a distance from each other to provide the required room for imaging objectives 121 and 122. In some embodiments, spacer portion 115 has no extent and image areas 111 and 112 are located immediately next to each other. Image areas 111 and 112 and spacer portion 115 may or may not occupy the full extent of imaging sensor 110.

Stereo camera device 100 further includes a support piece 180 for imaging sensor 110, which is in contact with an enclosure 190. Enclosure 190 may provide structural support for imaging objectives 121 and 122. In certain embodiments, support piece 180 and enclosure 190 cooperate to prevent light from reaching imaging sensor 110 through undesired routes. Enclosure 190 is integrally formed or consist of several elements that are combined, e.g., by gluing or bonding, in some embodiments. Optionally, enclosure 190 is constructed such that light can reach imaging sensor 110 only by passing through all optical elements of imaging objective 121 or 122. System 100 is produced using wafer level manufacturing methods in certain embodiments. For example, imaging sensor 110 and support piece 180 may be part of a lower wafer, while imaging objective 121, imaging objective 122, and enclosure 190 may be part of an upper wafer, such that assembly of the upper and lower wafer forms imaging system 100. One method for manufacturing system 100 by wafer level manufacturing and assembly is discussed in connection with FIG. 4.

Other configurations of support piece 180 and enclosure 190 may be used to hold imaging sensor 110 and imaging objectives 121 and 122 in the relative positions described in the present disclosure without departing from the scope hereof. Such other configurations include configurations that do not serve to prevent light from reaching imaging sensor 110 through undesired routes, and/or configurations that do not facilitate wafer level manufacturing methods.

Figure 3:
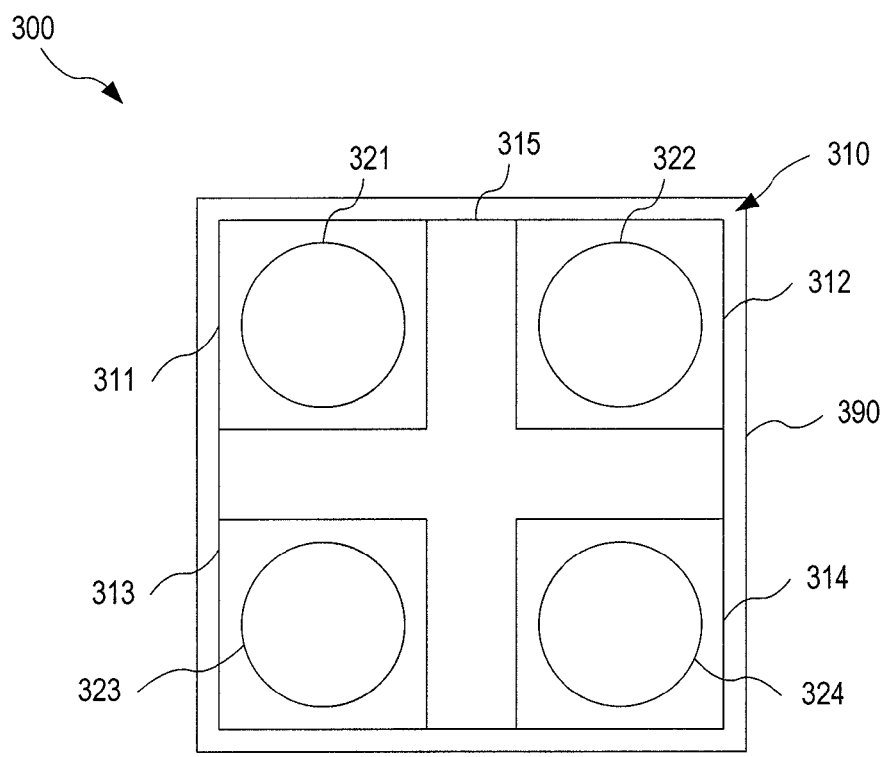
FIG. 3 illustrates one exemplary stereo camera device based on four imaging systems sharing a single imaging sensor, in top plan view, according to an embodiment.

FIG. 3 is an illustration of a stereo camera device 300 based on a single imaging sensor, in top plan view. Stereo camera device 300 is similar to stereo camera device 100 of FIGS. 1 and 2 and shares an elevational view therewith. Stereo camera device 300 is an extension of stereo camera device 100 (FIGS. 1 and 2) from two imaging systems to four independent imaging systems sharing a single imaging sensor 310. Imaging sensor 310 include four image areas 311, 312, 313, and 314, equivalent to image area 111 and 112 of stereo camera device 100 (FIGS. 1 and 2), dedicated to capture a images formed by imaging objectives 321, 322, 323, and 324 respectively. Imaging areas 311, 312, 313, and 314 are separated by a spacer portion 315 having similar configuration and function to spacer portion 115 in stereo camera device 100 of FIGS. 1 and 2. Likewise, an enclosure 390 and a support piece (not shown in FIG. 3) are of similar configuration and serve the same purposes as enclosure 190 and support piece 180 of stereo camera device 100 (FIGS. 1 and 2).

Stereo camera devices 100 and 300 of FIGS. 1, 2, and 3 are exemplary embodiments of stereo camera devices, wherein the individual imaging systems share the same imaging sensor. In such devices, the "imaging sensors" used by the individual imaging objectives, e.g., image areas 111 and 112 of stereo camera device 100 or image areas 311, 312, 313, and 314 of stereo camera device 300, are known to be in the same plane, specifically the plane of the imaging sensor, e.g., imaging sensor 110 of stereo camera device 100 or imaging sensor 310 of stereo camera device 300. This eliminates an important aspect of the uncertainty of the relative positioning of the individual imaging systems. Accurate alignment of the imaging objectives relative to the imaging sensor, e.g., alignment of imaging objectives 121 and 122 relative to imaging sensor 110 of stereo camera device 100 (FIGS. 1 and 2) may be ensured by manufacturing. Wafer level manufacturing is particularly suitable for achieving accurate relative alignment.

Figure 4:
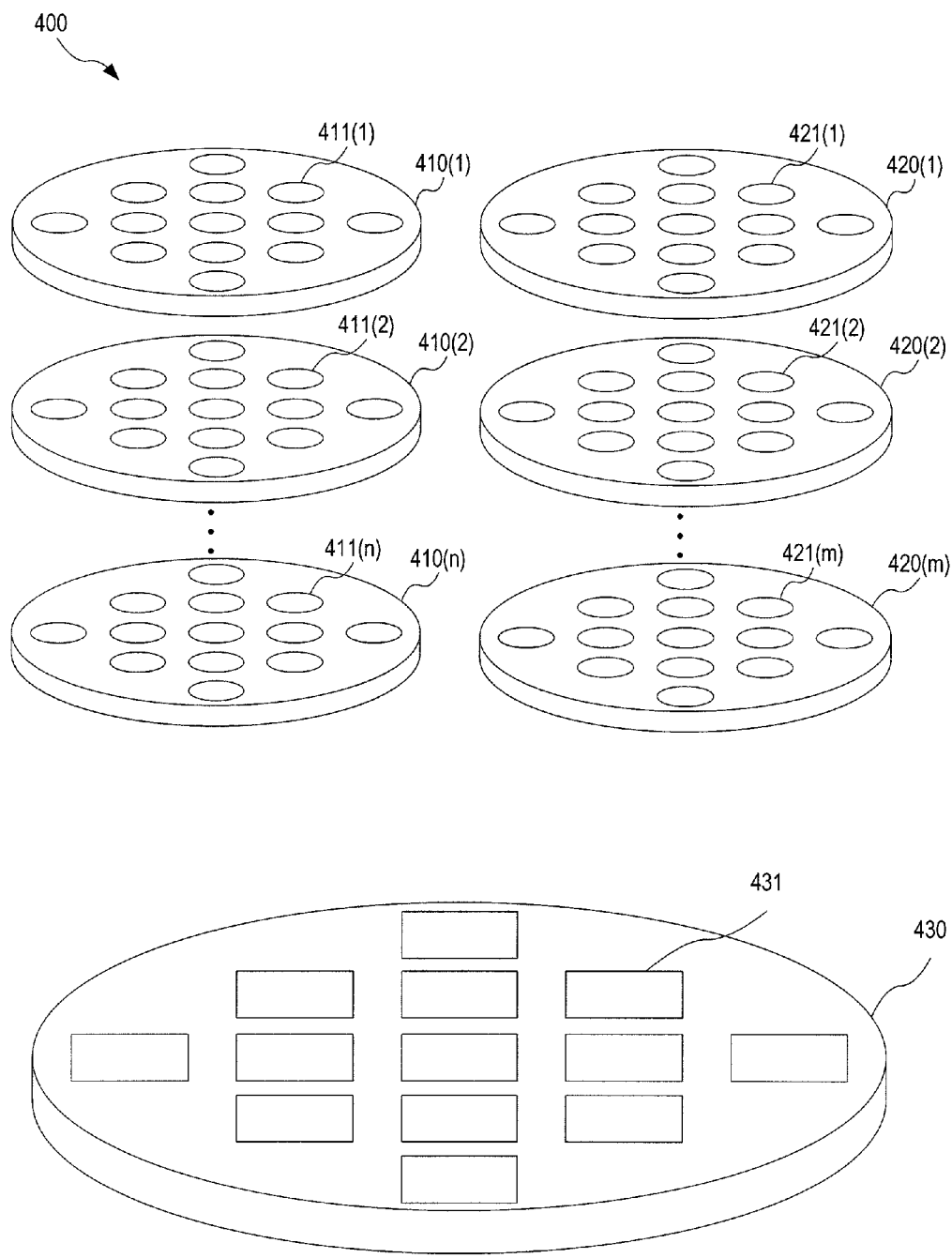
FIG. 4 illustrates one exemplary wafer-level manufacturing method for manufacturing of the stereo camera devices disclosed herein, according to an embodiment.

FIG. 4 is a schematic illustration of a set 400 of exemplary wafers used to manufacture stereo cameras as disclosed herein using wafer level manufacturing methods. A set of lens wafers 410(*i*), where i=1, . . . , n, are used to manufacture an imaging objective, e.g., imaging objective 121 of stereo camera device 100 in FIGS. 1 and 2. Each of the wafers 410(*i*) contains a set of identical elements 411(*i*). In certain embodiments, an element 411(*i*) is, for example, a lens, an aperture, a filter, or a structural piece such as an enclosure, e.g., enclosure 190 of stereo camera device 100 in FIGS. 1 and 2 or part thereof. Elements 411(*i*) in lens wafer 410(*i*) may be the same or different from elements 411(*j*) in lens wafer 410(*j*), where i is different from j. Lens wafers 410(*i*) are assembled using standard wafer level manufacturing methods to produce a set of identical imaging objectives. Sensor wafer 430 includes identical imaging sensors 431. According to one embodiment, sensor wafer 430 is a restructured wafer.

For manufacturing of stereo camera devices based on two or more identical imaging objectives, the required number of imaging objectives, e.g., the imaging objectives formed by assembly of lens wafers 410(*i*), are placed on an imaging sensor 431 using any one of known pick and place methods. Any image sensor coatings, e.g., optional coating 130 of stereo camera device 100 (FIGS. 1 and 2) are applied to imaging sensors 431 before assembly with the imaging objectives. For stereo camera devices based on a set of different imaging objectives, such as certain embodiments of stereo camera devices 1200 (FIGS. 12 and 13), 1400 (FIGS. 14 and 15), and 1600 (FIGS. 16 and 17), each type of imaging objective may be constructed by independent wafer assembly processes. For illustration, a second set of lens wafers 420(*i*), where i=1, . . . m, each contain corresponding elements 421(*i*). Note that m may be different from n, i.e., the set of lens wafers 410(*i*) may contain a different number of wafers than the set of lens wafers 420(*i*). Examples of elements 421(*i*) include, but are not limited to, a lens, an aperture, a filter, or a structural piece such as an enclosure, e.g., enclosure 190 of stereo camera device 100 in FIGS. 1 and 2 or part thereof. Elements 421(*i*) and elements 421(*j*), where i is different from j, may be identical or different. Assembly of lens wafers 420(*i*) results in the production of an imaging objective. Any number of different types of imaging systems may be produced in this manner and subsequently placed onto sensor wafer 430 using standard pick and place methods.

Cross talk between independent imaging systems of a stereo camera device may adversely affect the performance of the stereo camera system, particularly in a compact device with a relatively short distance or distances between the independent imaging systems. Such compact systems image a given object in the scene onto locations in the independently formed images, which are shifted relative to each other to a lesser degree than what would be the case for stereo camera systems with greater distances between the independent imaging systems. The calculation of the physical location of the object relative to the stereo camera is based in part on the locations of the imaged object in the independently formed images, and the corresponding relative shifts. Therefore, the accuracy to which these locations and shifts are measured is crucial for accurate determination of the physical location of the object. Cross talk between imaging systems is any light propagating from one imaging system into the image captured by another imaging system. Examples include overlap between the images formed by individual imaging objectives and stray light propagating between individual imaging systems. Cross talk may adversely affect the quality of the captured images, which in turn has the potential of reducing the accuracy with which imaged object locations are determined.

Spacer portions 115 of stereo camera device 100 (FIGS. 1 and 2) and spacer portion 315 of stereo camera device 300 (FIG. 3) may serve to avoid overlap between images formed by imaging objectives 121 and 122 of stereo camera device 100 and imaging objectives 321, 322, 323, and 324 of stereo camera device 300, respectively. Spacer portions 115 (FIGS. 1 and 2) and 315 (FIG. 3) may further be located and sized to reduced stray light propagating between individual imaging systems. In certain embodiments, enclosures 190 (FIGS. 1 and 2) and 390 (FIG. 3) are also configured to leave only a small gap between the enclosure and the imaging sensor, thereby reducing the amount of stray light that may propagate between individual imaging systems. With configurations as discussed here, the spacer portions between individual imaging systems, e.g. spacer portions 115 (FIGS. 1 and 2) or 315 (FIG. 3) and the enclosures 190 (FIGS. 1 and 2) or 390 (FIG. 3), may thus function together to provide improved image quality over stereo camera devices without such measures for reducing cross talk between individual imaging systems.

Figure 5:
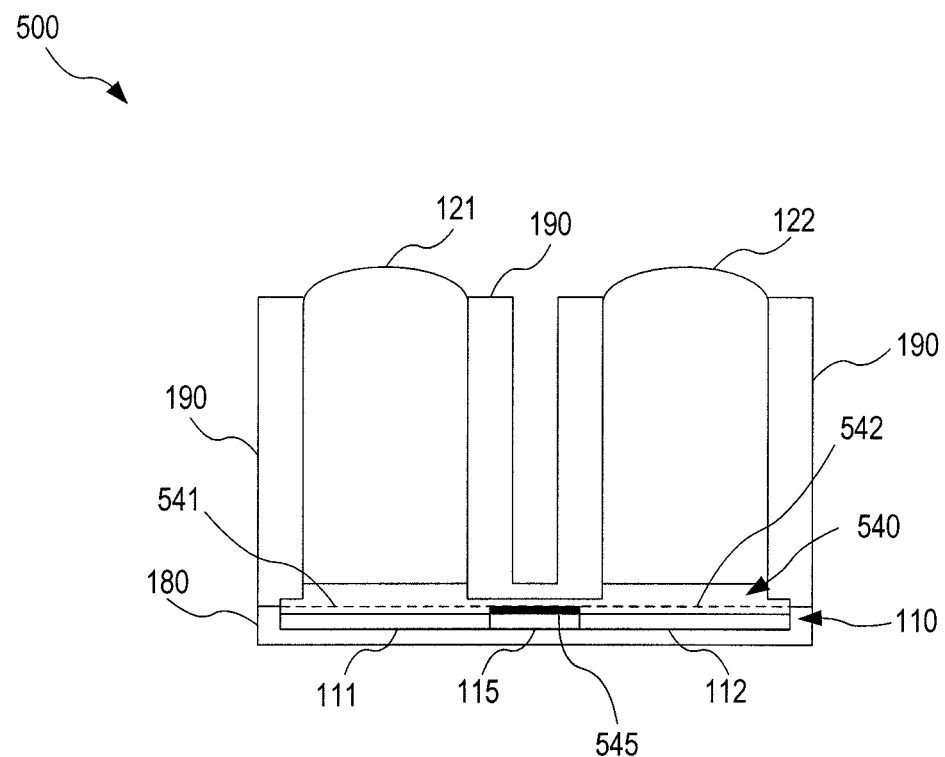
FIG. 5 illustrates one exemplary stereo camera device, which includes a light absorbing coating between its two imaging systems, in elevational view, according to an embodiment.
Figure 6:
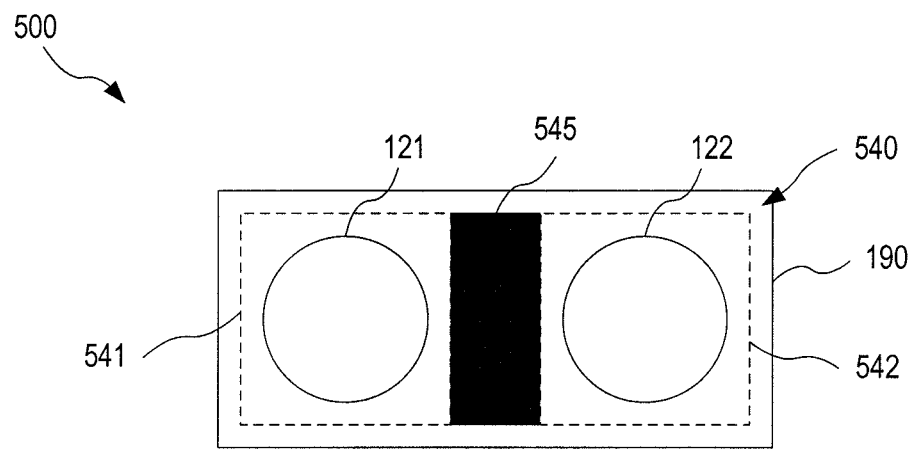
FIG. 6 illustrates the stereo camera device of FIG. 5 in top plan view.

FIG. 5 is an elevational view of a stereo camera device 500, which is a modification of stereo camera device 100 (FIGS. 1 and 2). FIG. 6 shows a top plan view of stereo camera device 500. In stereo camera 500, the optional coating 130 of stereo camera 100 is replaced by a non-homogeneous coating 540 including optional coatings 541 and 542 over image areas 111 and 112, respectively, and a light absorbing coating 545 over spacer portion 115. In one exemplary embodiment, light absorbing coating 545 is a black coating. Light absorbing coating 545 attenuates stray light propagating into the space between enclosure 190 and imaging sensor 100 over spacer portion 115. In one embodiment, light absorbing coating 545 may has an absorbance of 90%. Compared to the equivalent device without a light absorbing coating, e.g., stereo camera devices 100 and 300 of FIGS. 1 and 2 and FIG. 3 respectively, light absorbing coating 545, according to this embodiment, reduces the stray light propagating between individual imaging systems by 90% for stray light propagation paths requiring a single bounce off of light absorbing coating 545. Greater attenuation is achieved with enclosure 190 configured to leave only a small gap to imaging sensor 110. A small gap between enclosure 190 and imaging sensor 110 increases the number of bounces stray light will need to make off both enclosure 190 and light absorbing coating 545 in order to complete a path of propagation to another imaging system. Increasing the number of necessary bounces off light absorbing coating 545 from one to two increases the total absorbance from 90% to 99% in the embodiment where light absorbing coating has an absorbance of 90%. The total absorbance is an exponential function of the number of bounces off light absorbing coating 545, which means that a relatively small number of bounces are sufficient to practically eliminate any detectable stray light propagating between individual imaging systems.

Non-homogeneous coating 540 may be manufactured using well-known, conventional methods such as the methods used to apply a Bayer filter onto an imaging sensor. In an alternative embodiment, non-homogeneous coating 540 is applied to a separate substrate, which is then placed over imaging sensor 110. However, direct application of non-homogeneous coating 540 onto imaging sensor 110 requires a smaller number of manufacturing steps.

Figure 7:
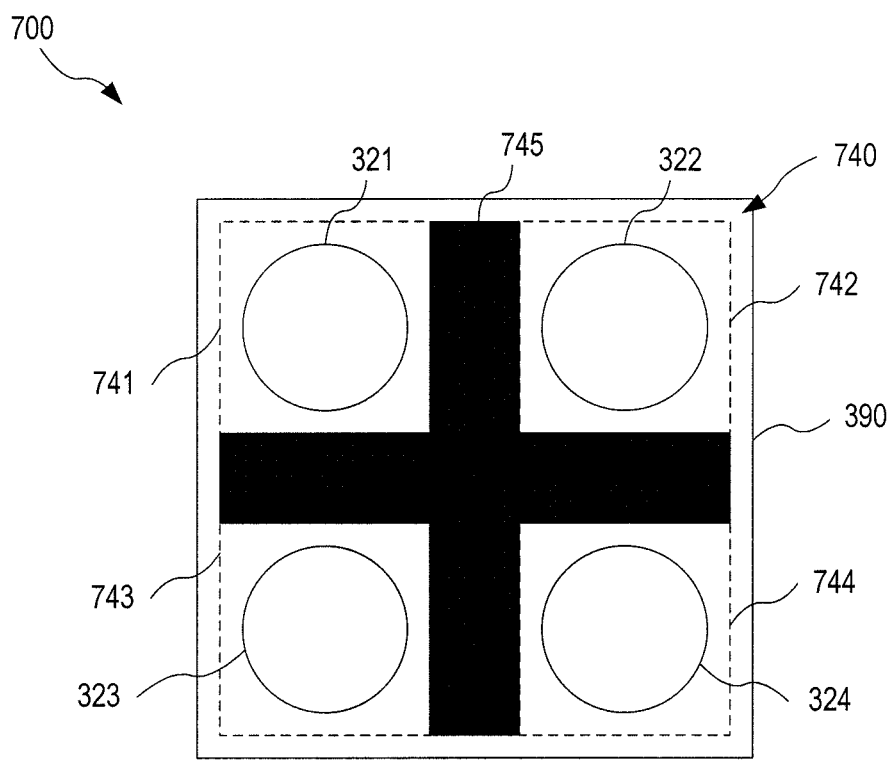
FIG. 7 illustrates one exemplary stereo camera device, which includes a light absorbing coating between its four imaging systems, in top plan view, according to an embodiment.

FIG. 7 illustrates an extension of stereo camera device 500 to four individual imaging systems in top plan view in FIG. 7. Stereo camera device 700 of FIG. 7 is equivalent to stereo camera device 300 of FIG. 3 with optional coating 330 replaced with a non-homogeneous coating 740 including optional coatings 741, 742, 743, and 744 over image areas 311, 312, 313, and 314 (not shown in FIG. 7), and a light absorbing coating 745 over spacer portion 315 (not shown in FIG. 7). The same properties apply to non-homogeneous coating 740 as those discussed above for non-homogeneous coating 540 of stereo camera device 500 (FIGS. 5 and 6).

Figure 8:
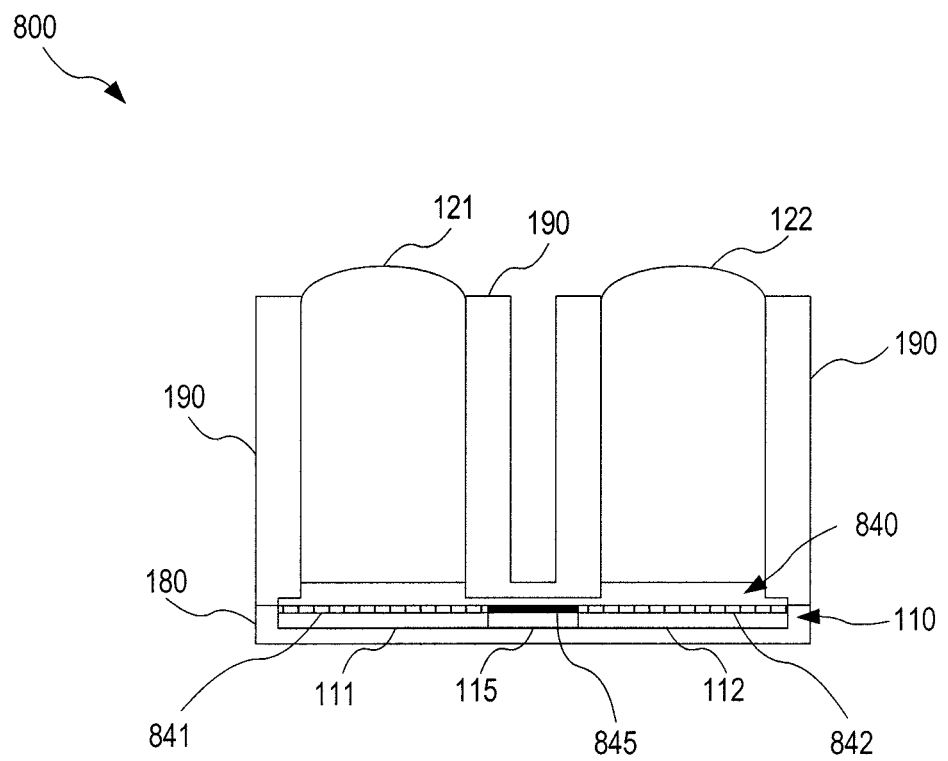
FIG. 8 illustrates, in elevational view, one exemplary stereo camera device with two imaging systems sharing a single imaging sensor, where the imaging sensor includes a non-homogeneous coating for color image capture and reduction of cross talk between the two imaging systems, according to an embodiment.
Figure 9:
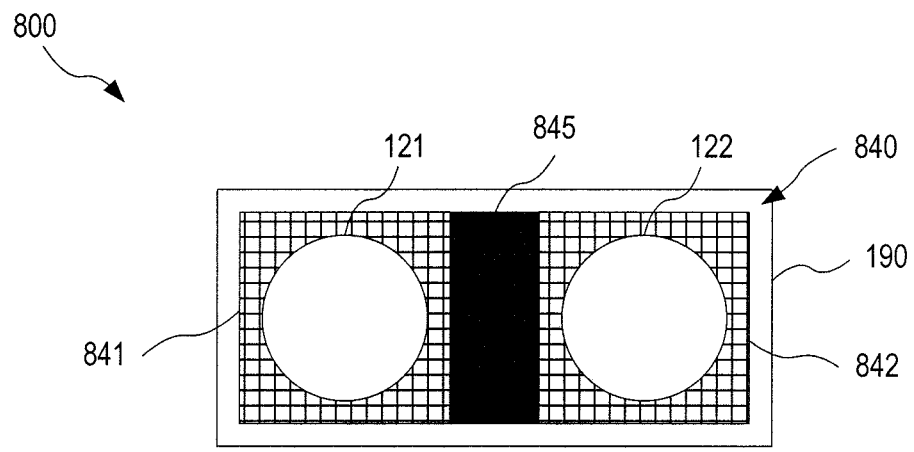
FIG. 9 illustrates the stereo camera device of FIG. 8 in top plan view.

In an embodiment, one or more of the optional coatings 541 and 542 of non-homogeneous coating 540 are color filters providing color image capture capability for stereo camera device 500. FIGS. 8 and 9 illustrate a stereo camera device 800 with color image capture capability, in elevational and top plan view respectively. Stereo camera device 800 is a modification of stereo camera device 500 of FIGS. 5 and 6, wherein non-homogeneous coating 540 is replaced by a non-homogeneous coating 840 including a color filter 841 over image area 111 and a color filter 842 over image area 112. Color filters 841 and 842 may be identical and/or may be Bayer filters. Non-homogeneous coating 840 further includes a light absorbing coating 845 over spacer portion 115, which have similar properties and function to light absorbing coating 545 of stereo camera device 500 (FIGS. 5 and 6). Stereo camera device 800 may be extended to having a larger number of individual imaging systems, for example four, without departing from the scope of the present disclosure.

Non-homogeneous coating 840 may be produced using conventional manufacturing methods such as those used to apply Bayer filters to imaging sensors. Bayer filters are composed by three types of coatings: a coating "R" that absorbs all light that does not belong to the red portion of the visible spectrum, a coating "G" that absorbs all light except green, and a coating "B" that absorbs all light except blue. Bayer filters are typically produced by sequential application and development of each of the three different coatings R, G, and B. In one embodiment, non-homogeneous coating 840 is produced by the addition of a black application and development, to produce light absorbing coating 845, increasing the number of sequential applications from three to four. In another embodiment, light absorbing coating 845 is produced by applying and developing, for instance, coating R on top of coating B. This combined coating will not transmit visible light. Using the combined coating method, non-homogeneous coating 840 may be produced using the standard Bayer filter production process with no added complexity.

A color filter, such as a Bayer filter, places a given color coating, e.g., R, G or B, onto each individual pixel. Hence, several pixels must be grouped together in order to obtain the full color information. Specifically, the Bayer filter is based on groups of four pixels in a 2×2 configuration, consisting of one R coated pixel, two G coated pixels, and one B coated pixel. Accordingly, the resolution of a color imaging sensor is decreased by a factor of two compared to that of the equivalent monochrome sensor with no color filter. Consequently, a stereo camera device based on monochrome image capture has higher resolution than the equivalent color stereo camera device using the same sensor. Further, the amount of light captured by a single pixel on a color sensor is only a fraction of the total incident light. The reasons for this are twofold: (a) Standard color filters such as the Bayer filter are based on absorptive filtering and the maximum transmission in the wavelength range that is transmitted by the filter typically does not exceed 70%, and (b) each color coating only transmits light in only a portion of the visible spectrum, a wavelength range most often narrower than the full spectrum of light incident on a given pixel. These two factors cause a reduction in the signal-to-noise ratio for each individual pixel on a color sensor compared to the equivalent monochrome sensor with no color filter. In low light situations, this may result in less accurate object location or a lost ability to locate a certain object. In summary, monochrome stereo camera devices provide more accurate three-dimensional object location capability than that of an equivalent stereo camera device using the same imaging sensor with a color filter applied. However, color image capture may be required for reasons unrelated to object location capability, and some stereo camera device applications may require the determination of both location and color of objects in the scene.

Figure 10:
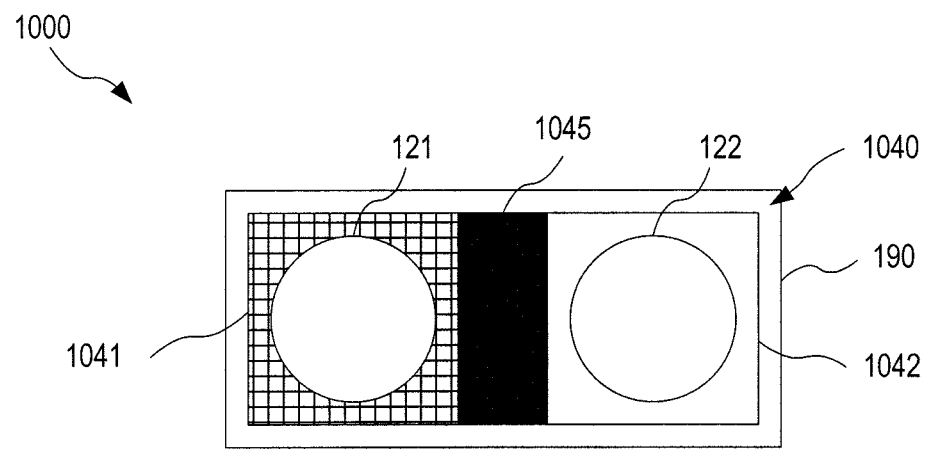
FIG. 10 illustrates one exemplary stereo camera device with two imaging systems sharing a single imaging sensor, wherein the imaging sensor includes a non-homogeneous coating enabling simultaneous capture of color and monochrome images with reduced cross talk between the two imaging systems, according to an embodiment.

FIG. 10 is a top plan view a stereo camera device 1000 based on two individual imaging systems using the same imaging sensor, wherein one imaging system captures monochrome images while the other has color image capture capability. Stereo camera device 1000 is an embodiment of stereo camera device 500 of FIGS. 5 and 6 with a different non-homogeneous coating. Compared to stereo camera device 500 of FIGS. 5 and 6, the non-homogeneous coating of stereo camera device 1000 includes a color coating 1041, e.g., a Bayer filter, over image area 111 (not shown in FIG. 10) corresponding to imaging objective 121, an uncoated portion 1042 over image area 112 (not shown in FIG. 10) corresponding to imaging objective 122, and a light absorbing coating 1045 over spacer portion 115 (not shown in FIG. 10). Light absorbing coating 1045 has the same properties and function as light absorbing coating 545 of stereo camera device 500 (FIGS. 5 and 6). Stereo camera device 1000 provides color image capture capability with the imaging system composed of imaging objective 121, color coating 1041, and image area 111 (not shown in FIG. 10). Simultaneously, stereo camera device 1000 provides three dimensional object location using the combined information from the two individual imaging systems. However, compared to the similar stereo camera device 800 of FIGS. 8 and 9, stereo camera device 1000 has improved resolution in one of the two individual imaging systems, i.e., that composed of imaging objective 122, uncoated portion 1042, and image area 112 (not shown in FIG. 10). Therefore, stereo camera device 1000 provides improved three-dimensional object location over stereo camera device 800, while providing simultaneous color image capture.

Figure 11:
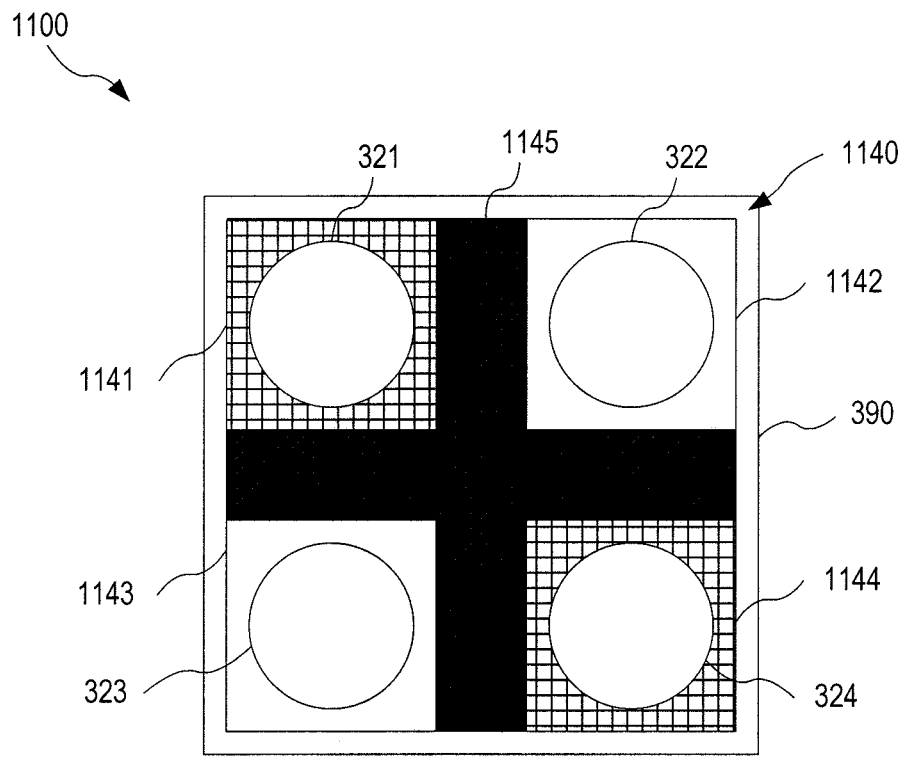
FIG. 11 illustrates one exemplary stereo camera device with four imaging systems sharing a single imaging sensor, wherein the imaging sensor includes a non-homogeneous coating enabling simultaneous capture of color and monochrome images with reduced cross talk between the four imaging systems, according to an embodiment.

FIG. 11 shows a stereo camera device 1100 based on four individual imaging systems using the same imaging sensor. Stereo camera device 1100 is an embodiment of stereo camera device 700 of FIG. 7 with a different non-homogeneous coating 1145 including color coatings 1141 and 1144, e.g., Bayer filters, over image areas 311 and 314 (not shown in FIG. 11), where image areas 311 and 314 correspond to imaging objectives 321 and 324. Non-homogeneous coating 1145 also include uncoated portions 1142 and 1143 over image areas 312 and 313 (not shown in FIG. 11), where image areas 312 and 313 correspond to imaging objectives 322 and 323. Non-homogeneous coating 1140 further includes a light absorbing coating 1145 over spacer portion 315 (not shown in FIG. 11), where light absorbing coating 1145 has the same properties and function as light absorbing coating 545 of stereo camera device 500 (FIGS. 5 and 6). Stereo camera device 1100 provides color image capture using one or both of the imaging systems corresponding to color coatings 1141 and 1144, as well as uncompromised resolution and, hence, uncompromised three-dimensional object location using the imaging systems corresponding to uncoated portions 1142 and 1143.

In certain embodiments, stereo camera device 800 of FIGS. 8 and 9, stereo camera device 1000 of FIG. 10, and stereo camera device 1100 of FIG. 11 are made without light absorbing coatings 845, 1045, and 1145, respectively, without departing from the scope of the present disclosure. Likewise, in some embodiments, stereo camera devices 800, 1000, and 1100 (FIGS. 8, 9, 10, and 11) are made without spacer portions 115 and 315, without departing from the scope of the present disclosure.

Figure 12:
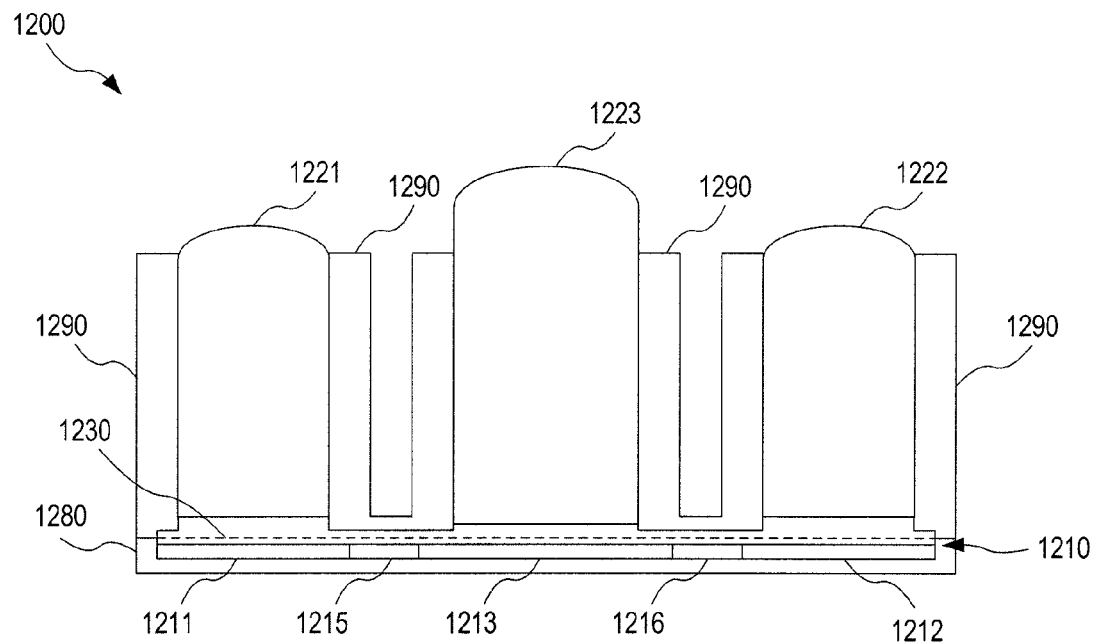
FIG. 12 illustrates one exemplary stereo camera device with three imaging systems sharing a single imaging sensor, in elevational view, according to an embodiment.
Figure 13:
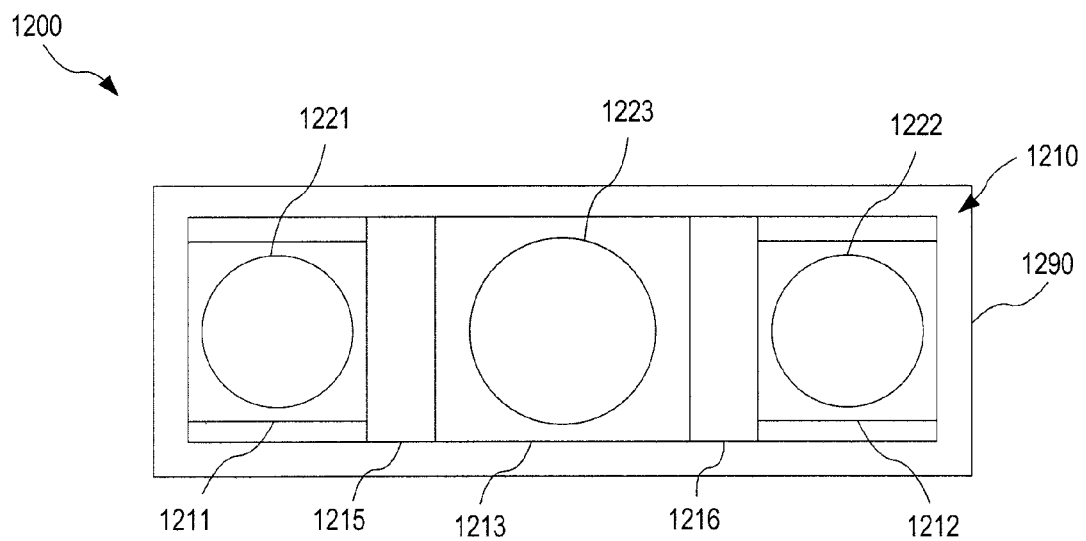
FIG. 13 illustrates the stereo camera device of FIG. 12 in top plan view.

FIGS. 12 and 13 illustrate a stereo camera device 1200 with three imaging systems sharing a single imaging sensor in elevational view (FIG. 12) and top plan view (FIG. 13). Stereo camera device 1200 includes an imaging sensor 1210 and three imaging objectives 1221, 1222, and 1223. In some embodiments, imaging objectives 1221, 1222, and 1223 contain multiple lenses and other elements such as apertures and filters. Imaging objectives 1221, 1222, and 1223 may include wafer level lens stacks and be configured to enable wafer level manufacturing. In an embodiment, imaging objectives 1221 and 1222 are identical. In another embodiment, imaging objective 1223 is different from imaging objectives 1221 and 1222. Imaging sensor 1210 include image areas 1211, 1212, and 1213 dedicated to capture of images formed by imaging objectives 1221, 1222, and 1223, respectively, a spacer portion 1215 located between image areas 1211 and 1213, and a spacer portion 1216 located between image areas 1212 and 1213. Spacer portions 1215 and 1216 have the same properties and functions as spacer portion 115 in stereo camera device 100 of FIGS. 1 and 2. Image areas 1211, 1212, 1213, and spacer portions 1215 and 1216 may or may not occupy the full extent of imaging sensor 1210.

In an embodiment spacer portions 1215 and 1216 have no extent and image areas 1211, 1213, and 1212 are located immediately next to each other. Imaging sensor 1210 further includes an optional coating 1230; for example, a color filter coating of the Bayer filter type or similar, enabling color image capture for stereo camera device 1200.

Stereo camera device 1200 include a support piece 1280 and an enclosure 1290 having the same properties and functions as support piece 180 and enclosure 190 of stereo camera device 100 (FIGS. 1 and 2). It is to be understood that support piece 1280 and enclosure 1290 may be configured differently than shown in FIGS. 12 and 13. For example, both support piece 1280 and enclosure 1290 may be composed of several components and/or be matched differently from the configuration shown in FIG. 12, wherein support piece 1280 and enclosure 1290 are joined at a plane coinciding with the top surface of imaging sensor 1210.

Three-dimensional location information may be obtained from any pair of imaging systems included in stereo camera device 1200. In an embodiment, the imaging system formed by imaging objective 1221 and image area 1211 is identical to the imaging system formed by imaging objective 1222 and image area 1212. Since these two imaging systems constitute the pair of imaging systems with the furthest possible separation in stereo camera device 1200, they may be advantageously used to provide three-dimensional location information. In another embodiment, the imaging system formed by imaging objective 1223 and image area 1213 is different from the imaging systems including imaging objectives 1221 and 1222. Such an embodiment may be configured to provide three-dimensional location information from the imaging systems including imaging objectives 1221 and 1222 while capturing images of different properties using the imaging system including imaging objective 1223. In certain embodiments, the imaging system formed by imaging objective 1223 and image area 1213 are configured to record images of different field-of-view extent, image size, aspect ratio, magnification, aberrations, brightness, spectral properties, and/or focus than the images recorded by the other two imaging systems in stereo camera device 1200. Optionally, the imaging system formed by imaging objective 1223 and image area 1213 includes autofocus and/or auto exposure capabilities.

Figure 14:
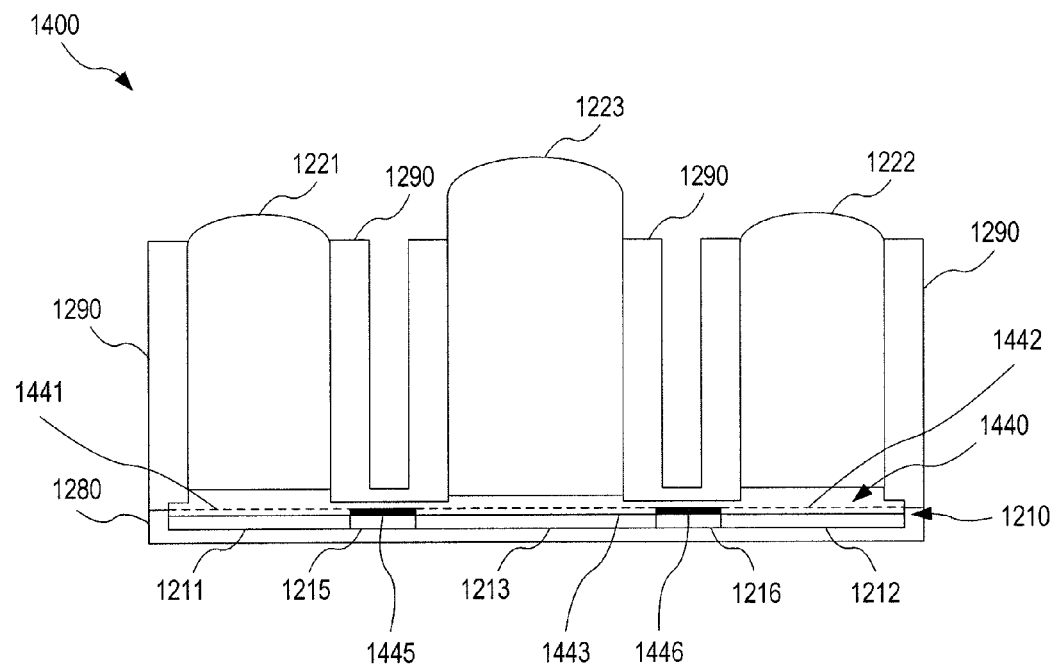
FIG. 14 illustrates, in elevational view, one exemplary stereo camera device with three imaging systems sharing a single imaging sensor, wherein the imaging sensor includes light absorbing coatings to reduce cross talk between the different imaging systems, according to an embodiment.
Figure 15:
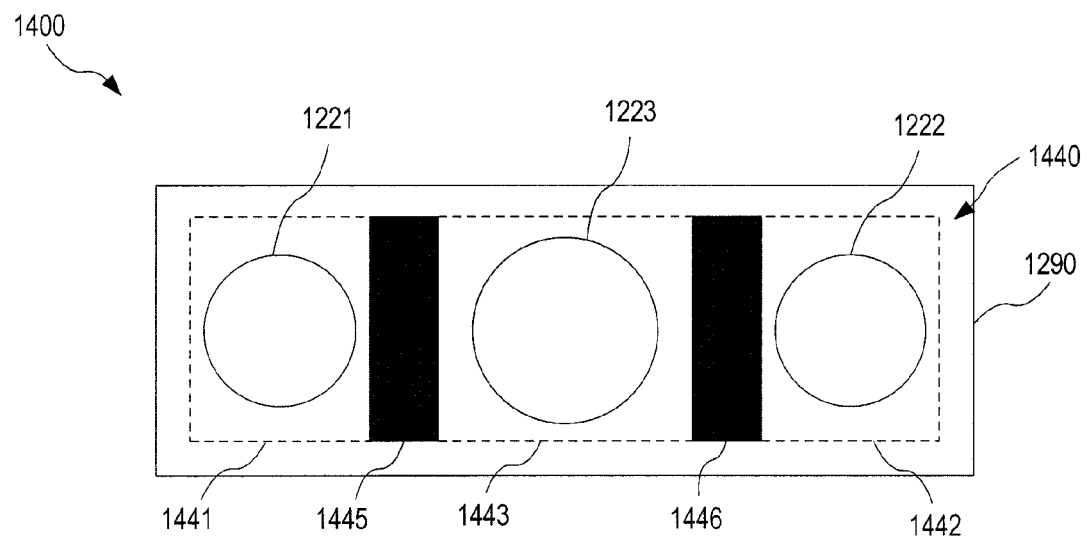
FIG. 15 illustrates the stereo camera device of FIG. 14 in top plan view.

FIGS. 14 and 15 show a modification of stereo camera device 1200 (FIGS. 12 and 13) as stereo camera device 1400 in elevational and top plan view, respectively. In stereo camera device 1400, the optional coating 1230 of stereo camera device 1200 (FIGS. 12 and 13) is replaced by a non-homogeneous coating 1440. Non-homogeneous coating 1440 includes optional coatings 1441, 1442, and 1443 over image areas 1211, 1212, and 1213, respectively, and light absorbing coatings 1445 and 1446 over spacer portions 1215 and 1216, respectively. In some embodiments, one or more of optional coatings 1441, 1442, and 1443 are color filter coatings, e.g., Bayer filters, enabling color image capture for one or more of the imaging systems in stereo camera device 1200. Light absorbing coatings 1445 and 1446 have the same properties and functions as light absorbing coating 545 of stereo camera device 500 illustrated in FIG. 5 and may therefore provide enhanced performance of stereo camera device 1400 over stereo camera device 1200.

Figure 16:
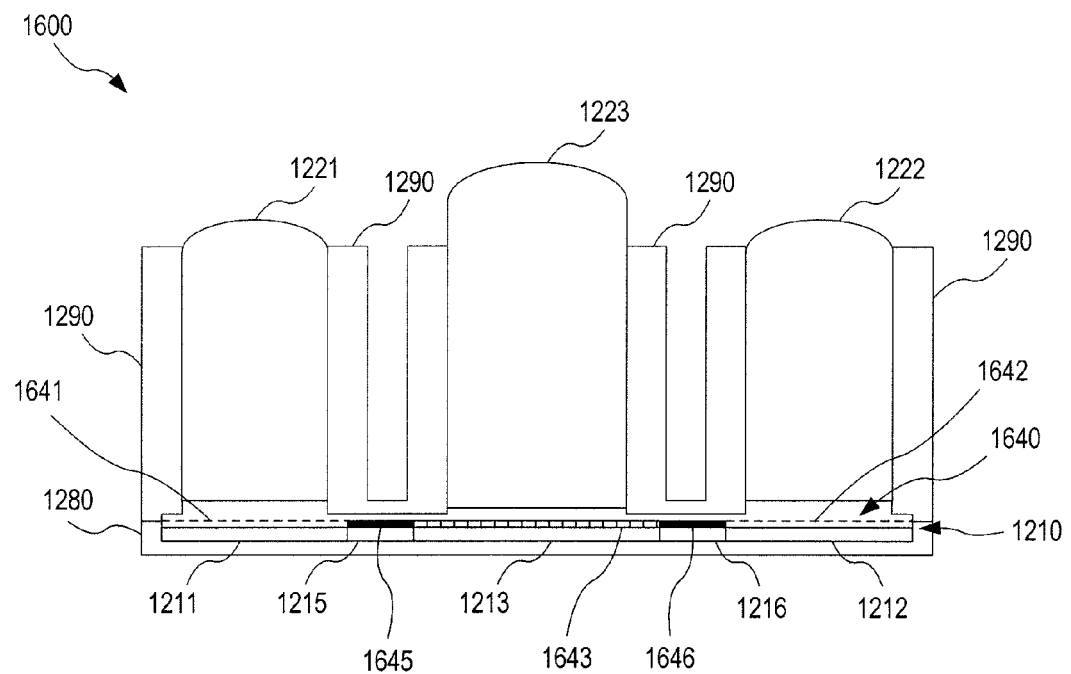
FIG. 16 illustrates one exemplary stereo camera device with three imaging systems sharing a single imaging sensor, wherein the imaging sensor includes a non-homogeneous coating to provide simultaneous color image capture and high-resolution stereo imaging and reduced cross talk between the different imaging systems, in elevational view, according to an embodiment.
Figure 17:
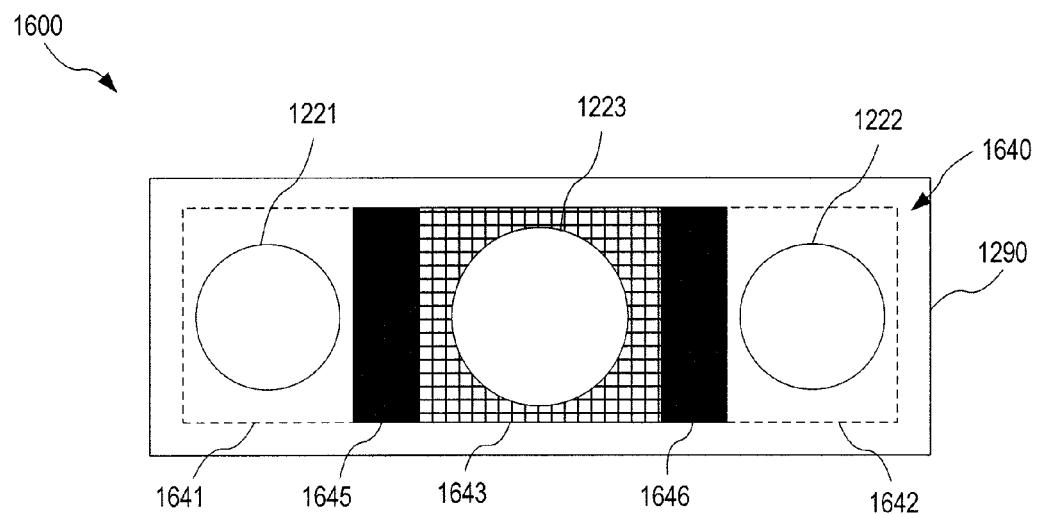
FIG. 17 illustrates the stereo camera device of FIG. 16 in top plan view.

An embodiment of stereo camera device 1400 containing a combination of monochrome and color imaging systems is shown in FIG. 16 (elevational view) and FIG. 17 (top plan view) as stereo camera device 1600. Stereo camera device 1600 differs from stereo camera device 1400 of FIGS. 14 and 15 only in the non-homogeneous coating of imaging sensor 1210. Stereo camera device 1600 includes a non-homogeneous coating 1640, which in turn includes a color filter 1643 over image area 1213, enabling color image capture for the imaging system formed by imaging objective 1223, color filter 1643, and image area 1213. Non-homogeneous coating 1640 further includes light absorbing coatings 1645 and 1646 over spacer portions 1215 and 1216, respectively, and optional coatings 1641 and 1642 over image areas 1221 and 1212.

In an embodiment, optional coatings 1641 and 1642 are configured such that the two imaging systems including objectives 1221 and 1222, respectively, capture monochrome images at the maximum resolution of imaging sensor 1210. This may be achieved by, for instance, omitting optional coatings 1641 and 1642. In this configuration, three-dimensional location is provided at the highest possible quality using the pair of monochrome imaging systems including imaging objectives 1221 and 1222, while color images are recorded by the imaging system including imaging objective 1223. In certain embodiments, light absorbing coatings 1645 and 1646 and, optionally, spacer portions 1215 and 1216 are omitted from stereo camera device 1600. Such embodiments of stereo camera device 1600 are still configurable to provide simultaneous color image capture and three dimensional location information based on higher resolution monochrome images. Other methods may be implemented to reduce crosstalk and/or stray light propagation between the individual imaging systems, such as incorporating an actual barrier closing the gap between enclosure 1290 and imaging sensor 1210 as they are configured in FIG. 16. Alternatively, the imaging systems, particularly imaging objectives 1221, 1222, and 1223 may be designed such to produce images of the quality required for a given application without any additional features for reducing cross talk and/or stray light issues.

Figure 18:
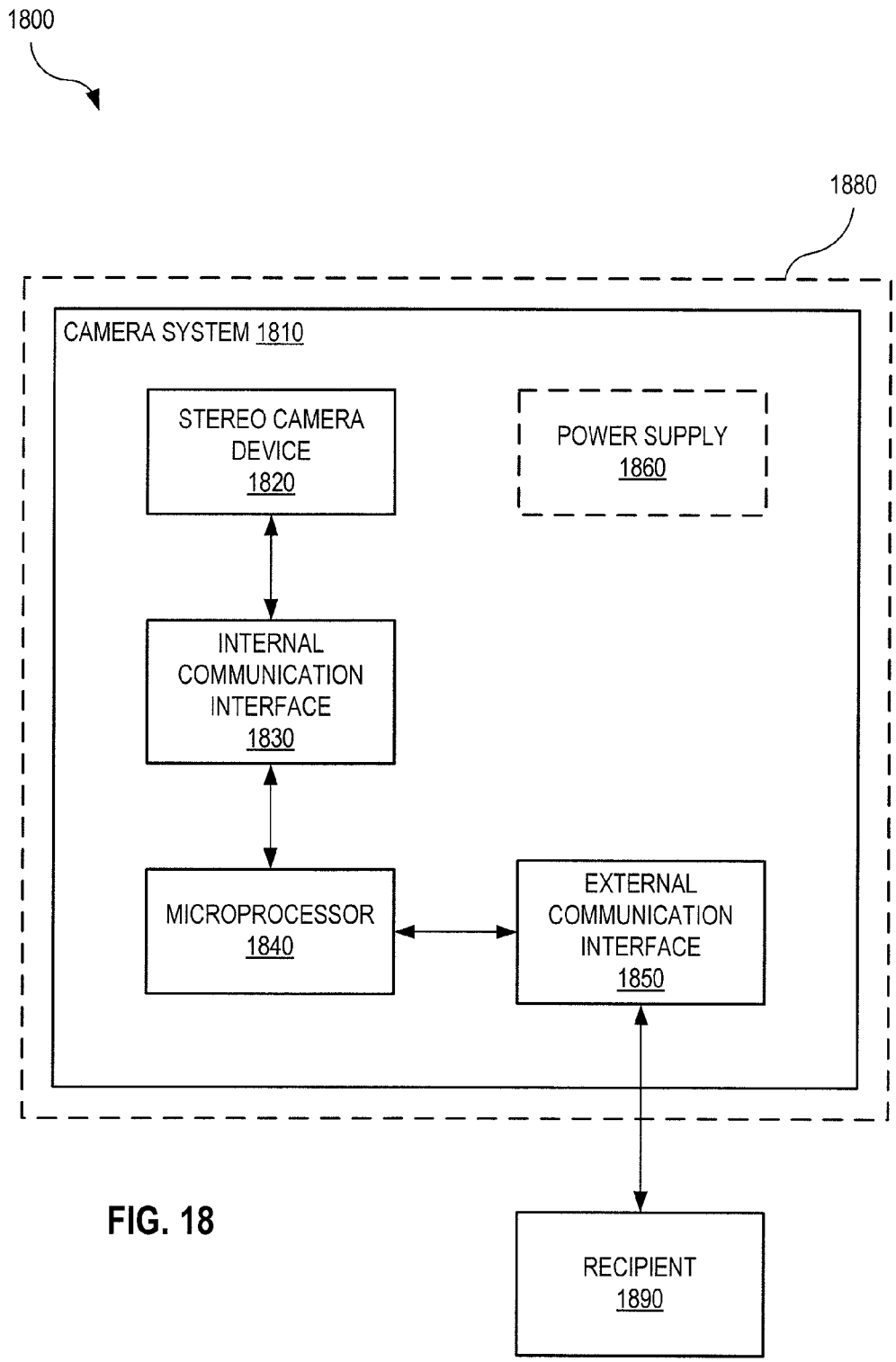
FIG. 18 illustrates one exemplary system that includes a stereo camera device, according to an embodiment.

FIG. 18 illustrates a system 1800 utilizing a stereo camera device 1820. Stereo camera device 1820 may be, for example one of stereo camera devices 100 (FIGS. 1 and 2), 300 (FIG. 3), 500 (FIGS. 5 and 6), 700 (FIG. 7), 800 (FIGS. 8 and 9), 1000 (FIG. 10), 1100 (FIG. 11), 1200 (FIGS. 12 and 13), 1400 (FIGS. 14 and 15), and 1600 (FIGS. 16 and 17). Stereo camera device 1820 is incorporated into a camera system 1810. Camera system 1810 includes a microprocessor 1840, which is in communication with stereo camera device 1820 via an internal communication interface 1830. Microprocessor 1840 is also in communication with a recipient 1890 via an external communication interface 1850. Recipient 1890 may be, for example, a person, a remote computer, or a separate display. External communication interface 1850 may include, for example, one or more of a display, wired communication port (e.g., USB, Ethernet, or FireWire), wireless communication port (e.g., Wi-Fi, Bluetooth, or cellular service), audible alert, and tactile feedback.

Camera system 1810 includes an optional power supply 1860. In embodiments without optional power supply 1860, an external source or sources supplies power to camera system 1810. Camera system 1810 further includes an optional enclosure 1880; for instance, a camera body or a box for environmental protection of components of camera system 1810. Optional enclosure 1880 has an opening (not shown in FIG. 18) allowing stereo camera device 1820 to image a scene external to optional enclosure 1880. Camera system 1810 may be a cell phone, a smart phone, a computer, a laptop, a personal digital assistant (PDA), a surveillance system, or a camera-only system, and, in some embodiments camera system 1810 includes other elements not shown in FIG. 18 and/or perform other functions than those related to stereo image capture. In an exemplary embodiment, camera system 1810 is a smart phone, microprocessor 1840 is the only microprocessor onboard the smart phone, and external communication interface 1850 is the primary external communication interface of the smartphone, including, e.g, a display, Bluetooth communication, Wi-Fi, and/or mini or micro USB. Stereo camera device 1820 is configured within the smart phone and utilizes the existing microprocessor and external communication interface of the smart phone.

Microprocessor 1840 and external communication interface 1850 may be configured such that recipient 1890 can control some or all aspects of the functionality of camera system 1810. Similarly, in an embodiment, microprocessor 1840 and internal communication interface 1830 are configured such that microprocessor 1840 controls the image capture performed by stereo camera device 1820. Control functions include, but are not limited to, image capture rate, exposure time, on-demand image capture. In another embodiment, internal communication interface 1830 is configured as a one-way communication interface, capable only of reading out images from stereo camera device 1820 and sending these images to microprocessor 1840. In this embodiment, stereo camera device 1820 may be preconfigured to capture images at a certain rate whenever powered on by optional power supply 1860 or an external power supply.

In some embodiments, microprocessor 1840 is capable of processing and storing images captured by stereo camera device 1820. For example, microprocessor 1820 may process images captured by stereo camera device 1820 to determine three-dimensional information. Microprocessor 1820 may further process the three-dimensional information to detect the presence of certain objects in the scene, including, but not limited to, moving objects, objects of a certain size or color, or objects within a certain distance of a specified location, and communicate findings to recipient 1890 via external communication interface 1850. Detection of a certain object in the scene may initiate a request by microprocessor 1840 to stereo camera device 1820 through internal communication interface 1830 to capture additional images. In an alternative embodiment, camera system 1810 includes separate processor and memory rather than microprocessor 1840.

The configurations of the stereo camera devices disclosed herein may be applied to produce other types of camera devices where several individual imaging systems share a single imaging sensor. For example, stereo camera device 1000 of FIG. 10 forms a camera device capable of simultaneous capture of color images and monochrome images and may function as such in applications unrelated to three-dimensional imaging. Any of the presently disclosed stereo camera devices may include non-identical imaging objectives for capture of images of, for example, different field of view, image size, brightness, and aberration properties. This is specifically illustrated in, for instance, stereo camera device 1200 of FIGS. 12 and 13. Such stereo camera devices may be used to capture images of the same scene at different magnifications providing simultaneous capture of wide-field images and narrower-field images providing enhanced detail in local areas of the scene.

Combination of Features

Features described above as well as those claimed below may be combined in various ways without departing from the scope hereof. For example, it will be appreciated that aspects of one camera device/system described herein may incorporate or swap features of another camera device/system described herein. The following examples illustrate possible, non-limiting combinations of embodiments described above. It should be clear that many other changes and modifications may be made to the devices, systems, and methods herein without departing from the spirit and scope of this invention:

(A) A camera device, including a single imaging sensor and a plurality of imaging objectives associated with the single imaging sensor, the single imaging sensor including a plurality of dedicated image areas within the single imaging sensor, each of the plurality of dedicated image areas corresponding to a respective one of the plurality of imaging objectives.

(B) In the device denoted as (A), the single imaging sensor may comprise a spacer portion between at least two of the plurality of dedicated image areas.

(C) In the device denoted as (B), the spacer portion may include a light absorbing material capable of reducing light from a particular one of the plurality of imaging objectives from reaching a particular one of the dedicated image areas that is respectively associated with an imaging objective different from the particular one.

(D) In the camera devices denoted as (A) through (C), the imaging sensor may further include a non-homogeneous coating over the surface upon which light from the plurality of imaging objectives is incident.

(E) In the camera device denoted as (D), the non-homogeneous coating may be configured such that at least two of the plurality of dedicated image areas have coating properties different from each other.

(F) In the camera devices denoted as (A) through (E), the plurality of imaging objectives may include at least two imaging objectives.

(G) The camera devices denoted as (A) through (F) may be configured such that, when seen looking perpendicular to a plane of the single imaging sensor, the plurality of dedicated image areas are separated from each other by a light absorbing spacer portion.

(H) In the camera devices denoted as (A) and (G), the at least two imaging objectives may be identical to one another.

(I) In the camera devices denoted as (A) through (H), the plurality of imaging objectives may include at least four imaging objectives.

(J) The camera device denoted as (I) may be configured such that, when seen looking perpendicular to a plane of the single imaging sensor, the at least four imaging objectives form a rectangular shape.

(K) In the camera devices denoted as (I) and (J), the at least four imaging objectives may be identical to one another.

(L) In the camera devices denoted as (J) and (K), when seen looking perpendicular to a plane of the single imaging sensor, the plurality of image areas may be separated from each other by a light absorbing spacer portion.

(M) In the camera devices denoted as (A) through (H), the plurality of imaging objectives may include at least three imaging objectives arranged linearly along the single imaging sensor.

(N) In the camera device denoted as (M), a center one of the at least three imaging objectives may be different from two outer ones of the at least three imaging objectives.

(O) In the camera devices denoted as (M) and (N), the dedicated image area corresponding to a center one of the at least three imaging objectives may be configured for color image capture.

(P) In the camera device denoted as (O), the dedicated image areas corresponding to two outer ones of the at least three imaging objectives may be configured for monochrome image capture.

(Q) In the camera devices denoted as (C), (G), and (L), the light absorbing spacer portion may include a light absorbing coating.

(R) The camera device denoted as (Q) may further include a structural element that cooperates with the light absorbing coating to increase the amount of light absorbed by the light absorbing coating.

(S) The camera devices denoted as (A) through (R) may include a non-homogeneous coating, for example, one or more of a color filter, a monochrome coating, an uncoated portion, and a light-absorbing coating.

(T) In the camera device denoted as (S), the color filter may include an RGB pixel array.

(U) In the camera devices denoted as (A) through (T), the single imaging sensor may include at least one of a CCD array and a CMOS array.

(V) In the camera devices denoted as (A) through (U), the plurality of imaging objectives may include one or more optical elements.

(W) In the camera device denoted as (V), the one or more optical elements may include a lens, an aperture, a filter, and/or a wafer-level lens stack.

(X) The camera devices denoted as (A) through (W) may include structural elements for attaching the plurality of imaging objectives to the single imaging sensor.

(Y) In the camera device denoted as (X), the structural elements may include an enclosure at least partially encasing the plurality of imaging objectives and the single imaging sensor.

(Z) In the camera devices denoted as (X) and (Y), the structural elements may include a material capable of blocking light from outside of the structural elements from reaching the single imaging sensor.

(AA) In the camera devices denoted as (X) through (Z), the enclosure may include at least one support piece integral with a bottom portion of the single imaging sensor.

(AB) The camera devices denoted as (A) through (AA), may be configured such that images formed by the each of the plurality of imaging objectives may be recorded by the single imaging sensor.

(AC) The camera devices denoted as (A) through (AB) may further include a microprocessor in communication with the single imaging sensor.

What is claimed is:

1. A camera device, comprising:
a single imaging sensor;
a plurality of imaging objectives associated with the single imaging sensor; and
a plurality of dedicated image areas within the single imaging sensor, each of the dedicated image areas corresponding to a respective one of the imaging objectives, such that images formed by each of the imaging objectives may be recorded by the single imaging sensor, wherein, when viewed along a direction perpendicular to the single imaging sensor, the image areas are separated from each other by a light absorbing spacer portion including a light absorbing coating.

2. The camera device of claim 1, wherein the light absorbing spacer portion comprises a light absorbing material capable of reducing light from a particular one of the plurality of imaging objectives from reaching a particular one of the dedicated image areas that is respectively associated with an imaging objective different from the particular one.

3. The camera device of claim 1, the imaging sensor further comprising a non-homogeneous coating over a surface upon which light from the plurality of imaging objectives is incident.

4. The camera device of claim 3, wherein the non-homogeneous coating is configured such that at least two of the plurality of dedicated image areas have coating properties different from each other.

5. The camera device of claim 4, wherein the non-homogeneous coating includes one or more of a color filter, a monochrome coating, an uncoated portion, and a light-absorbing coating.

6. The camera device of claim 5, wherein the color filter comprises an RGB pixel array.

7. The camera device of claim 1, wherein the single imaging sensor is a digital imaging sensor comprising at least one of a CCD array and a CMOS array.

8. The camera device of claim 1, wherein each of the plurality of imaging objectives comprises one or more optical elements.

9. The camera device of claim 8, wherein the one or more optical elements include a lens, an aperture, a filter, and/or a wafer-level lens stack.

10. The camera device of claim 1, further comprising structural elements for attaching the plurality of imaging objectives to the single imaging sensor.

11. The camera device of claim 10, wherein the structural elements comprise an enclosure at least partially encasing the plurality of imaging objectives and the single imaging sensor.

12. The camera device of claim 11, wherein the enclosure comprises a material capable of blocking light from outside of the enclosure from reaching the single imaging sensor.

13. The camera device of claim 11, wherein the enclosure includes at least one support piece integral with a bottom portion of the single imaging sensor.

14. The camera device of claim 1, wherein at least two of the imaging objectives are identical to one another.

15. The camera device of claim 1, wherein the plurality of imaging objectives includes at least four imaging objectives, and wherein, when seen along the direction perpendicular to the single imaging sensor, the at least four imaging objectives form a rectangular shape and the plurality of image areas are each separated from each other by the light absorbing spacer portion.

16. The camera device of claim 15, wherein the at least four imaging objectives are identical to one another.

17. The camera device of claim 1, further comprising a structural element cooperating with the light absorbing spacer portion to increase the amount of light absorbed by the light absorbing spacer portion.

18. The camera device of claim 1, wherein the plurality of imaging objectives includes at least three imaging objectives arranged linearly along the single imaging sensor.

19. The camera device of claim 18, wherein a center one of the at least three imaging objectives is different from two outer ones of the at least three imaging objectives.

20. The camera device of claim 19, further comprising a non-homogeneous coating, the non-homogeneous coating comprises a color filter coating over the image area corresponding to the center one of the at least three imaging objectives, and no coating or a monochrome coating over image areas corresponding to the two outer ones of the at least three imaging objectives.

21. The camera device of claim 18, further comprising a non-homogeneous coating.

22. The camera device of claim 21, wherein the non-homogeneous coating comprises a color filter coating over the image area corresponding to a center one of the at least three imaging objectives, and no coating or a monochrome coating over image areas corresponding to two outer ones of the at least three imaging objectives.

23. The camera device of claim 1, further comprising a microprocessor in communication with the single imaging sensor.

* * * * *